No. 824,985. PATENTED JULY 3, 1906.
J. J. GREENE.
PLUMB AND LEVEL.
APPLICATION FILED OCT. 25, 1905.
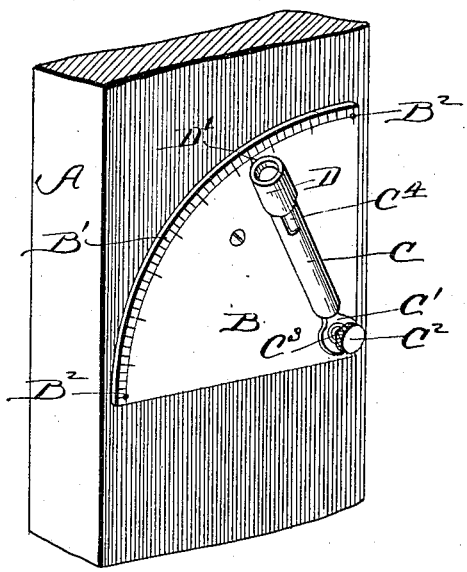
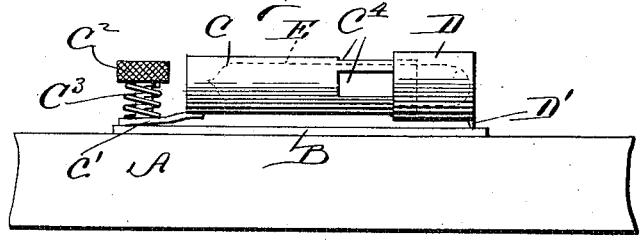
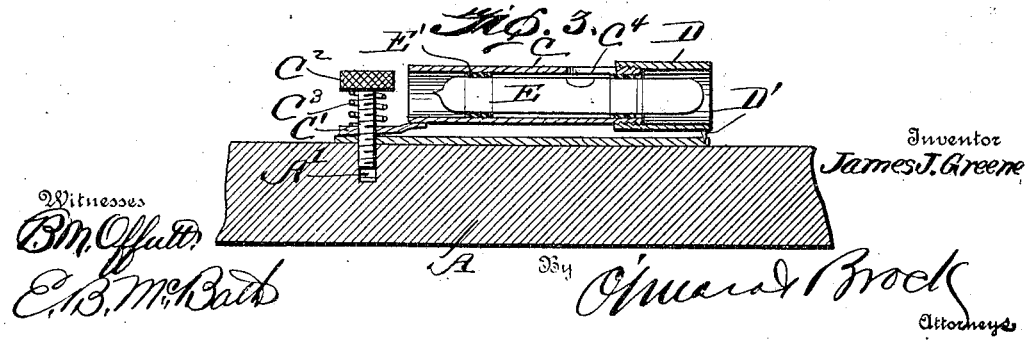
Inventor
James J. Greene
Witnesses

UNITED STATES PATENT OFFICE.

JAMES JACKSON GREENE, OF MEMPHIS, TENNESSEE.

PLUMB AND LEVEL.

No. 824,985.      Specification of Letters Patent.      Patented July 3, 1906.

Application filed October 25, 1905. Serial No. 284,362.

*To all whom it may concern:*

Be it known that I, JAMES JACKSON GREENE, a citizen of the United States, residing at Memphis, in the county of Shelby and State of Tennessee, have invented a new and useful Improvement in a Plumb and Level, of which the following is a specification.

This invention relates to a plumb and level adapted for use in determining various angles; and the object of the invention is to provide a straight-edge piece with a level which can be swung upon a pivot-point along a graduated scale and which is held by spring-pressure at any point along the said scale and which is automatically locked against movement over the ends of the scale.

The invention also consists of the novel features of construction hereinafter set forth, pointed out in the claims, and shown in the accompanying drawings, in which—

Figure 1 is a perspective view of a portion of a straight-edge piece having my improved leveling device in position thereon. Fig. 2 is a side elevation of a portion of a straight-edge block and my level. Fig. 3 is a longitudinal section through the parts shown in Fig. 2.

In the drawings, A represents a straight-edge block upon one face of which is secured a quadrant B, having a suitable scale B' laid off adjacent its curved edge.

The leveling device consists of a tube C open at each end and which at one end has a flat extension C', which extension is pivotally mounted upon a mill-headed screw $C^2$, which screw passes through a corner portion of the quadrant B and works in a threaded socket A', formed in the straight-edge A. A coil-spring $C^3$ is interposed between the head of the screw and the flat extension C' and bears downwardly upon the latter, holding it firmly in contact with the quadrant B. The tension of the spring $C^3$ can be regulated by turning the screw. The tube C is provided adjacent the end opposite the extension C' with a plurality of openings $C^4$ and adjacent this end is threaded, and a tube D, also threaded, is screwed over the threaded end of the tube C. In these tubes is arranged a glass bulb E, which contains the fluid usually found in sight or leveling instruments.

The free end of the tube D is provided with a pin D', which travels along the edge of the scale B', and at each end of the scale sockets $B^2$ are formed in the faces of the quadrant into which the pin D' drops as it reaches the ends of the scale, thereby preventing it from being accidentally moved off of the quadrant B.

The bulb E is of slightly less diameter than the tube C and is held in position by means of suitable washers or packing-rings E'.

By having a plurality of openings $C^4$ arranged circumferentially in the tube C the level can be used in a position above the level of the eyes as when viewed from below. Two of the said openings will be brought into alinement, and the air-space in the bulb E can be clearly seen between the two alining openings when the tubes are brought into a horizontal plane.

It will be obvious that by making the instrument of two tubes threaded together it can be lengthened or shortened, so that the pin D' will always travel in an arc which will throw the pin in the proper position upon the scale and in the socket $B^2$ when moved to the ends of the scale.

The advantages and manner of using the instrument will be apparent to those skilled in handling such devices.

Having thus fully described my invention, what I claim as new, and desire to secure by Letters Patent, is—

1. The combination with a quadrant having a scale thereon, a tube having a flat extension at one end, a screw working through the quadrant and passing loosely through the said extension, a spring encircling the screw and bearing upon the said extension, a second tube carried by the tube first mentioned, and adjustable thereon, a pin carried by the second-mentioned tube adapted to travel upon the scale and a glass bulb carried by the first tube.

2. A device of the kind described comprising a quadrant having a scale thereon, sockets adjacent to the ends of the scale, a pivoted tube movable upon the scale, a second tube threaded upon the pivoted tube and having a pin adapted to engage the sockets, and a sight-bulb carried within the tubes, one of said tubes having a plurality of circumferentially-arranged openings therein.

3. A device of the kind described comprising a quadrant having a scale thereon, and having sockets formed adjacent to the ends of the scale, tubes threaded together, one of said tubes having sight-openings therein, a flat extension, carried by the free end of one of said tubes, means for pivoting said extension to the quadrant, a spring adapted to bear upon said extension a pin carried by the free end of the other tube, and adapted to travel upon the scale and to engage the sockets at the ends of the scale, and a sight-bulb held in position within the said tubes.

JAS. JACKSON GREENE.

Witnesses:
  JOHN H. GREENE,
  E. HITCH.